(12) United States Patent
Zittel et al.

(10) Patent No.: US 8,087,349 B2
(45) Date of Patent: *Jan. 3, 2012

(54) ROTARY SCREW BLANCHER

(75) Inventors: David R. Zittel, Columbus, WI (US); Daniel D. Maupin, Corvallis, OR (US)

(73) Assignee: Lyco Manufacturing, Inc., Columbus, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,194

(22) Filed: May 7, 2010

(65) Prior Publication Data

US 2010/0218688 A1  Sep. 2, 2010

Related U.S. Application Data

(63) Continuation of application No. 11/216,478, filed on Aug. 31, 2005, now Pat. No. 7,735,415.

(51) Int. Cl.
*A47J 37/12* (2006.01)
*A23N 12/00* (2006.01)
*A23L 3/00* (2006.01)

(52) U.S. Cl. ............... 99/348; 99/404; 99/443 C

(58) Field of Classification Search ......... 99/348, 99/404, 405, 406, 443 C, 443 R; 366/318, 366/324, 144, 90, 79

See application file for complete search history.

(56) References Cited

U.S. PATENT DOCUMENTS

| | | | |
|---|---|---|---|
| 690,005 A * | 12/1901 | Anderson et al. | 99/404 |
| 4,291,619 A * | 9/1981 | Hunt et al. | 100/43 |
| 4,688,476 A | 8/1987 | Zittel | |
| 5,133,249 A | 7/1992 | Zittel | |
| 5,146,841 A | 9/1992 | Zittel | |
| 5,327,817 A | 7/1994 | Zittel | |
| 5,329,842 A | 7/1994 | Zittel | |
| 5,341,729 A | 8/1994 | Zittel | |
| 5,427,015 A | 6/1995 | Zittel | |
| 5,429,041 A | 7/1995 | Zittel | |
| 5,592,869 A | 1/1997 | Zittel | |
| 5,632,195 A | 5/1997 | Zittel | |
| 5,669,288 A | 9/1997 | Zittel et al. | |
| 5,752,431 A | 5/1998 | Zittel | |
| 5,802,961 A | 9/1998 | Hay et al. | |
| 6,095,035 A | 8/2000 | Zittel et al. | |
| 6,187,360 B1 | 2/2001 | Zittel et al. | |
| 6,205,913 B1 | 3/2001 | Zittel et al. | |
| 6,214,400 B1 | 4/2001 | Zittel et al. | |
| 6,234,066 B1 | 5/2001 | Zittel et al. | |
| 6,263,785 B1 | 7/2001 | Zittel | |
| 6,817,284 B2 | 11/2004 | Zittel | |
| 7,500,426 B2 | 3/2009 | Zittel et al. | |
| 2003/0230198 A1 | 12/2003 | Zittel | |

OTHER PUBLICATIONS

European Search Report, Application No. 05 25 8075, Applicant, Lyco Manufacturing, Inc., dated Mar. 14, 2007.
Declaration of David R. Zittel dated Nov. 23, 2005.
U.S. Appl. No. 12/569,970, filed Sep. 30, 2009.
U.S. Appl. No. 12/608,486, filed Oct. 29, 2009.

* cited by examiner

*Primary Examiner* — Reginald L Alexander
(74) *Attorney, Agent, or Firm* — George R. Corrigan

(57) ABSTRACT

A food processing apparatus includes a tank defining an inner compartment having an inlet end for receiving food product and an outlet end for discharging food product, an open-top screen mounted within the compartment and positioned relative to the tank in a first position, and a rotatable auger mounted such that at least a portion of the auger is within the screen for advancing food product within the tank from the inlet end of the tank toward the outlet end.

28 Claims, 8 Drawing Sheets

ROTARY SCREW BLANCHER

CROSS-REFERENCE TO RELATED APPLICATION

The present application is a continuation of and claims priority to co-pending U.S. patent application Ser. No. 11/216,478, filed Aug. 31, 2005, the entire contents of which are incorporated by reference.

BACKGROUND

The present invention relates to a rotary screw blancher, and in particular, a blancher for processing multiple products a day that is easy to clean between product runs.

In mass processing of food product, food product is often heated by cooking or blanching the food product in a food processing apparatus having a tank holding a heat transfer medium into which the food product is immersed. After cooking or blanching of the food product occurs, the food product is cooled or chilled by immersing the food product in a cool transfer medium so that the food product may be packaged, stored and/or shipped. In some known systems, a rotary drum blancher or a rotary screw blancher is used to first cook or blanch the food product and the food product is discharged onto a belt or other type of conveyor and advanced to a rotary cooler to reduce the food product temperature to an acceptable temperature. In another known system, a single compact apparatus to heat and cool the food product in continuous flow is used, that is a combination cooker-cooler.

In a rotary drum blancher, food product is introduced into an inlet end of an elongate drum, which is rotatably mounted in a generally cylindrical, open-top tank. The tank is fitted with a cover for minimizing heat loss and for enclosing the drum for safety reasons, and which can be opened for maintenance and cleaning. The drum includes an auger therein for advancing food product from the inlet end of the drum to an outlet end of the drum and through the heat transfer medium. The drum includes a structural frame with perforated skin panels, some of which may be pivotally attached to the frame to serve as access doors.

In a rotary screw blancher, food product is introduced into an inlet end of a generally cylindrical, open-top tank. A rotatable auger is mounted within the tank for advancing food product from the inlet end to an outlet end of the tank and through a heat transfer medium. The tank is fitted with a cover for minimizing heat loss and for enclosing the auger for safety reasons, and which can be opened for maintenance and cleaning.

The rotary blancher is used to cook a variety of food products, including pasta, rice, vegetables, dry beans, pouched meat and pouched sauces. Cleanliness is a concern in the food processing industry, and strict hygienic standards and inspections are observed throughout the industry for machinery that comes in contact with food for human consumption. Many facilities will process small batches of a variety of products in a single day or shift, which requires cleaning of the rotary blancher, and in particular the drum, between product runs. It is necessary for rotary blanchers to provide access for cleaning sprays to all joints and cavities within the drum where contaminant accumulation may occur. In current rotary drum blanchers, it is necessary to remove perforated skin panels from the drum frame or reposition access doors of the drum to perform the necessary cleaning. Such actions require high levels of labor and machine down time.

One solution is use of a rotary screw blancher, which is easier to clean because the blancher lacks a drum and has higher food product capacity than similarly sized rotary drum blanchers because food product can run at deeper depths. However, the auger causes more damage to food product as compared to rotary drum blanchers, especially if food product is caught in clearance gaps between the auger and the tank, the increased processing depth causes more friction between the food product and the auger flights, as well as the tank wall, and the increased depth causes increased temperature gradients in the process water.

SUMMARY

In one independent embodiment, a food processing apparatus may generally include a tank defining an inner compartment having an inlet end for receiving food product and an outlet end for discharging food product, an open-top screen mounted within the compartment and positioned relative to the tank in a first position, and a rotatable auger mounted such that at least a portion of the auger is within the screen for advancing food product within the tank from the inlet end of the tank toward the outlet end.

The screen may be movable to a second position to facilitate cleaning of the screen. The food processing apparatus may include a plurality of injectors disposed in the compartment between a tank wall and the screen, wherein the injectors discharge a fluid under pressure toward the screen. A clearance gap between the screen and auger flights of the auger may be less than about 0.5 inches.

In another independent embodiment, a rotary blancher may generally include a tank defining an inner compartment having an inlet end for receiving food product and an outlet end for discharging food product and an inlet for introducing heat transfer medium to the heat compartment. An open-top screen is mounted within the heat compartment and positioned relative to the tank in a first position and an auger is mounted such that at least a portion of the auger is within the screen and rotatable relative to the tank for advancing food product within the tank from the inlet end toward the outlet end and through the heat transfer medium. A lift assembly is positioned within the heat compartment at the outlet end of the tank. The lift assembly includes at least one lifting bucket rotatable with the auger for lifting food product from the screen and depositing food product in a discharge chute.

In yet another independent embodiment, a rotary cooker-cooler may generally include a tank having an inlet end and an outlet end and at least one baffle divides the tank into a first compartment and a second compartment. A first open-top screen is mounted within the first compartment and positioned relative to the tank in a first position, and a first rotatable auger is mounted such that at least a portion of the auger is within the first screen for advancing food product within the tank from the inlet end of the tank toward the baffle. A second open-top screen is mounted within the second compartment and positioned relative to the tank in a first position, and a second rotatable auger is mounted such that at least a portion of the auger is within the second screen for advancing food product within the tank toward the discharge end of the tank. A product transfer mechanism transfers food product from the first compartment to the second compartment.

In another independent embodiment, a method of cleaning a screen of a food processing apparatus is provided. The food processing apparatus includes a tank defining a compartment having an inlet end and an outlet end, an open-top screen mounted within the compartment and positioned relative to the tank in a first position, and a rotatable auger mounted such that at least a portion of the auger is within the screen for advancing food product within the tank from the inlet end toward the outlet end. The method may generally include unsecuring the screen relative to the tank, moving the screen to a second position, wherein the second position is no more than about 180° from the first position, cleaning the screen, moving the screen to the first position, and securing the screen relative to the tank.

Other independent aspects of the invention will become apparent by consideration of the detailed description, claims and accompanying drawings.

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
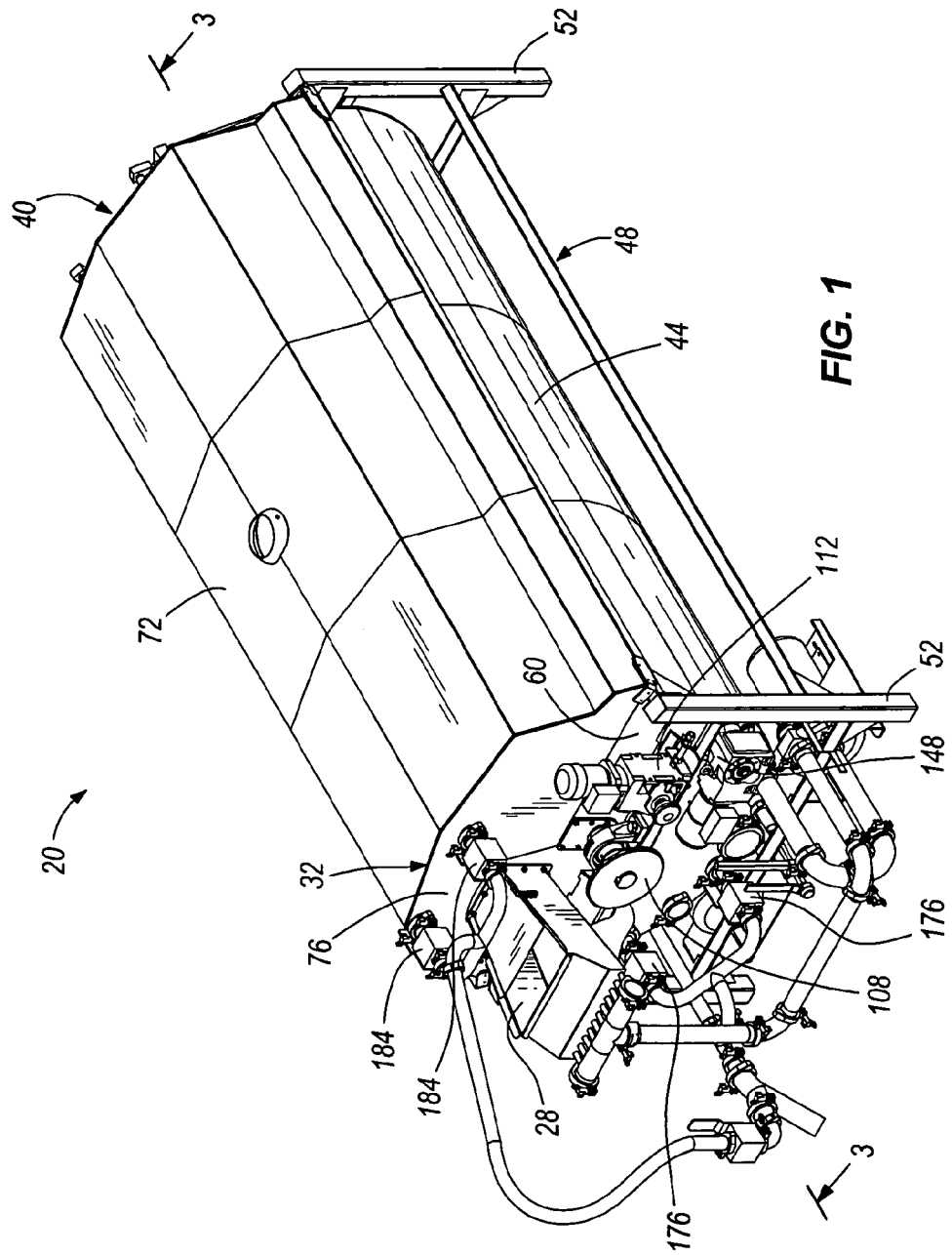
FIG. 1 is a perspective view of a rotary screw blancher embodying the invention.
Figure 2:
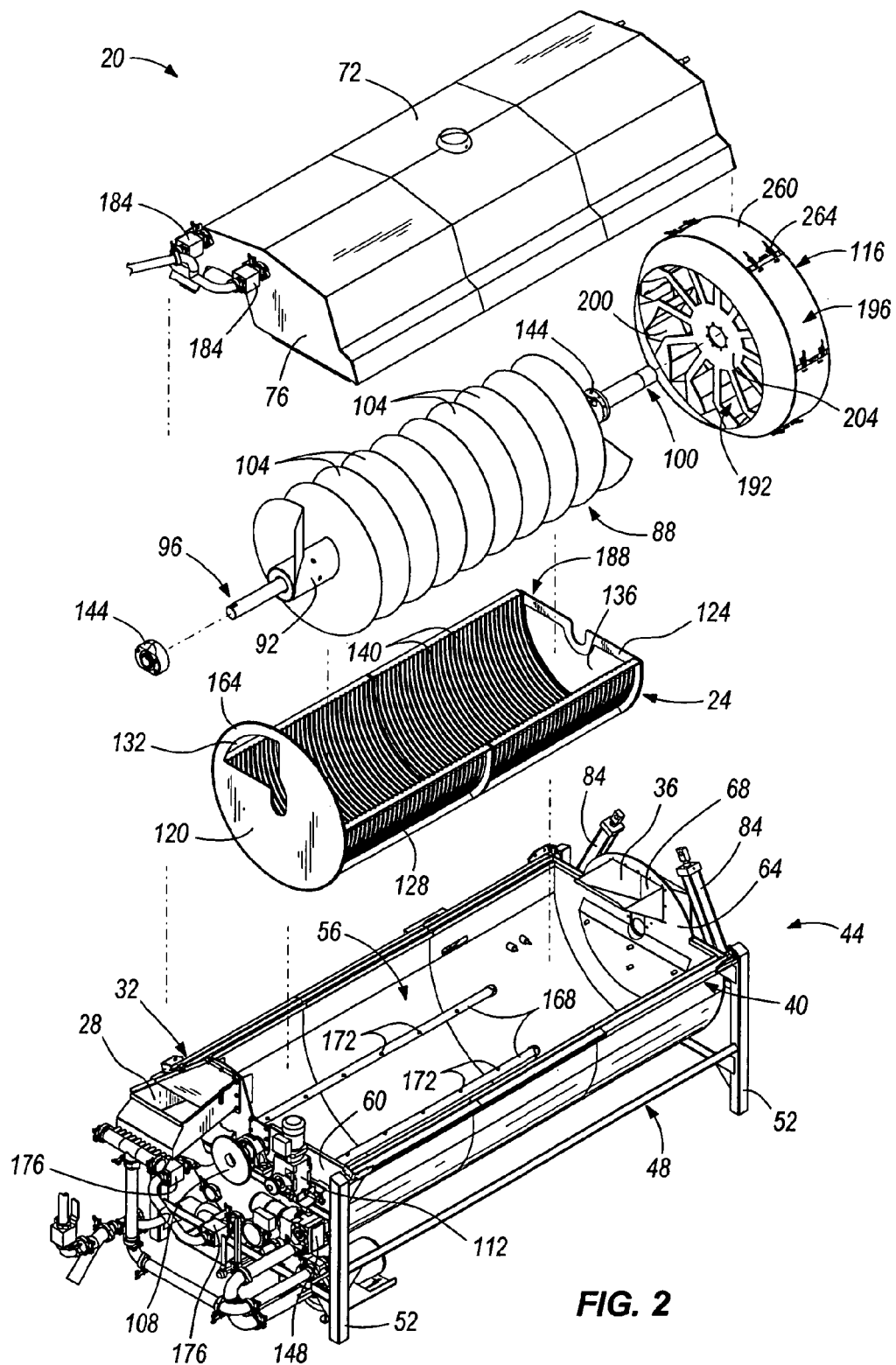
FIG. 2 is an exploded perspective view of the rotary screw blancher of FIG. 1.
Figure 3:
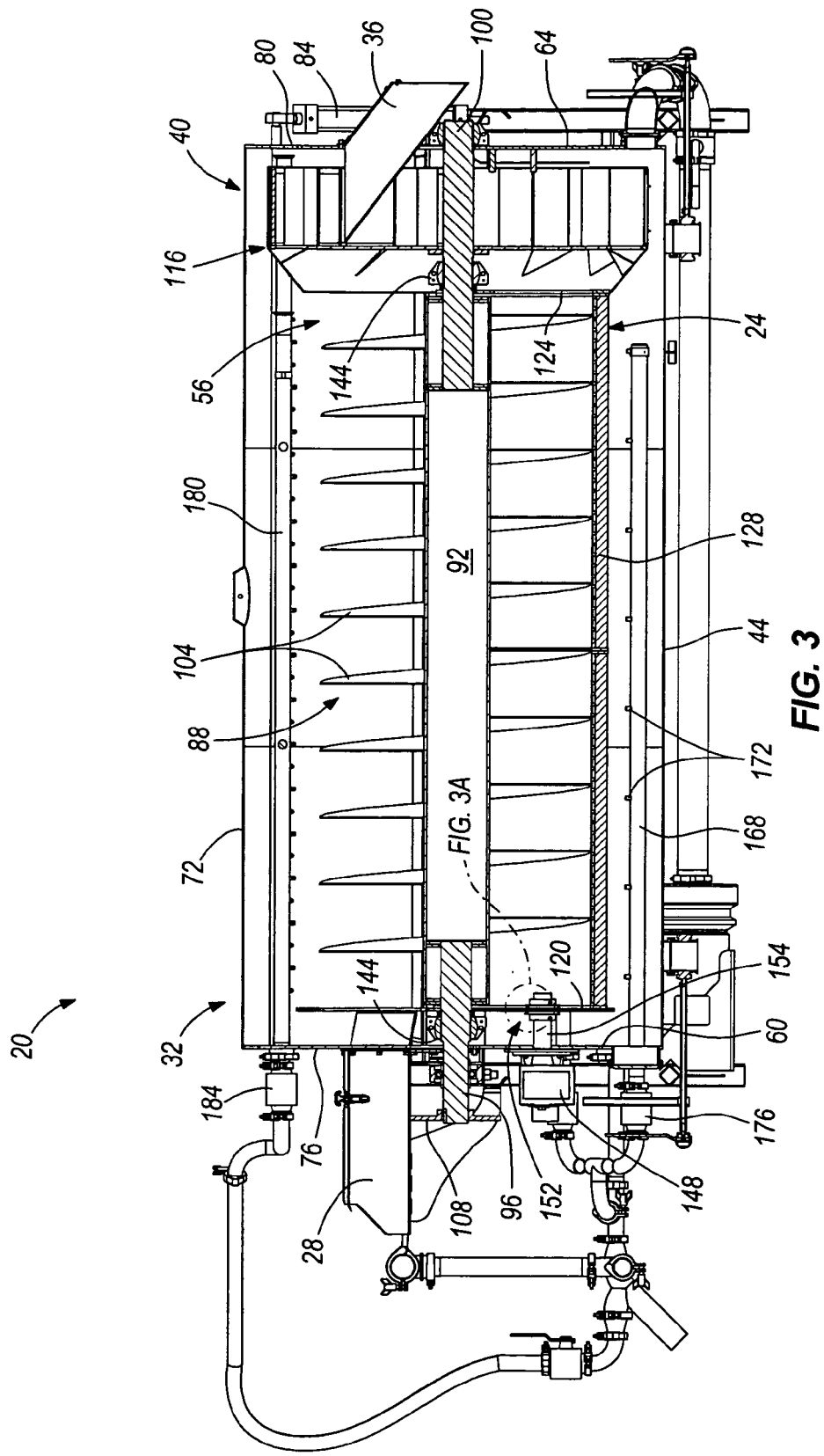
FIG. 3 is a sectional view of the rotary screw blancher taken along line 3-3 of FIG. 1.

FIGS. 1-3 show a rotary screw blancher 20 for use in a food processing system. The blancher 20, or cooker, uses a heat transfer medium to cook food product that advances through the blancher 20. The rotary blancher 20 includes an open-top screen 24 (FIG. 2) that facilitates cleaning of the screen 24 and blancher 20 and thereby reduces labor and machine downtime between product runs.

Food product is deposited into the rotary blancher 20 at an infeed flume 28 at an inlet end 32 and discharged from the blancher 20 at a discharge chute 36 (FIGS. 2 and 3) at an outlet end 40. The rotary blancher 20 includes an open-top tank 44 that is supported by a frame having legs 52 that rest upon a support surface and space the tank 44 above the support surface. The tank 44 defines, in part, an inner compartment 56 of the blancher 20. The tank 44 is preferably made of stainless steel or another suitable material for food processing applications. The tank 44 includes an inlet end wall 60 at the inlet end 32 of the tank 44 and an outlet end wall 64 at the outlet end 40 of the tank 44. Each end wall 60, 64 defines an opening 68 (only the opening at the outlet end wall 64 is shown in FIG. 2) that communicates with the inner compartment 56 of the tank 44. As shown in FIG. 3, the infeed flume 28 passes through the opening in the inlet end wall 60 and the discharge chute 36 passes through the opening 68 in the outlet end wall 64. It should be readily apparent to those of skill in the art that other configurations of the end walls, openings and chutes may be utilized in a further embodiment of the blancher 20.

An elongated vaulted cover 72 (FIGS. 1 and 2) mates with the tank 44 and covers the tank 44 to substantially enclose the inner compartment 56 and provide an enclosure for the heat transfer medium. In the illustrated embodiment, the cover 72 includes an inlet end wall 76 for positioning at the inlet end 32 of the blancher 20 and an outlet end wall 80 for positioning at the outlet end 40 of the blancher 20. Each cover end wall 76, 80 is configured to complement the tank end walls 60, 64 and the infeed flume 28 and discharge chute 36. The cover 72 is generally attached to the tank 44 in such a manner as to allow the cover 72 to move relative to the tank 44 and permit access to the inner compartment 56 of the blancher 20. In the illustrated embodiment, lift cylinders 84 extend between the tank 44 and the cover 72 to lift the cover 72 relative to the tank 44 and permit access to the screen 24 and the inner compartment 56. In another embodiment, the cover 72 is hindgedly connected to the tank 44 so the cover 72 can be swung away from the screen 24 to permit access to the screen 24 and the inner compartment 56.

An auger 88, or helical screw, is disposed within the tank 44 and rotates within the screen 24 for advancing food product from the inlet end 32 of the tank 44 toward the outlet end 40 of the tank 44. The auger 88 includes a shaft 92 that extends between the inlet end wall 60 and the outlet end wall 64 of the tank 44. To support the auger 88, a first end 96 of the shaft 92 is rotatably supported by the inlet end wall 60 of the tank 44 and a second end 100 of the shaft 92 is rotatably supported by the outlet end wall 64 of the tank 44. The auger 88 includes a plurality of axially spaced apart and interconnected flights 104 that spiral substantially the length of the inner compartment 56, although as seen in FIGS. 2 and 3, a portion of the shaft 92 remains flightless for accommodating other components of the rotary blancher 20. As the auger 88 rotates, the flights 104 move food product from the inlet end 32 of the tank 44 to the outlet end 40 of the tank 44. The flightless portions of the auger shaft 92 have a reduced diameter. The blancher 20 includes an auger sprocket 108 interconnected with the auger shaft 92 and a main drive motor 112, which drives rotation of the auger 88 and a lift assembly 116 (discussed below). In the illustrated embodiment, the infeed flume 28 is offset from a centerline of the tank 44 to accommodate the auger sprocket 108, however, in a further embodiment the infeed flume 28 and the auger sprocket 108 may be reconfigured to allow the infeed flume 28 to be positioned along the center line of the tank 44.

The open-top screen 24 is mounted in the inner compartment 56 of the tank 44 and is configured to transport food product received in the blancher 20 from the inlet end 32 to the outlet end 40 of the tank 44. The screen 24 includes an inlet end wall 120 proximate the inlet end wall 60 of the tank 44 and an outlet end wall 124 proximate the outlet end 40 of the tank 44 with a generally semi-cylindrical and perforate sidewall 128 that substantially extends between the screen end walls 120, 124. The inlet end wall 120 of the screen 24 defines an opening 132 for receiving the infeed flume 28 and the outlet end wall 124 defines an opening 136 to facilitate transfer of food product from the screen 24 to the lift assembly 116 (discussed below). The screen 24 is a wire screen that defines a plurality of small slots that extend completely through the sidewall 128 to allow heat transfer medium to pass to the inner compartment 56, through the sidewall 128 and into the screen 24. In another embodiment, perforations in the sidewall 128 of the screen 24 consist of a plurality of small diameter bores or slots, or laser cut holes or slots.

Figure 3A:
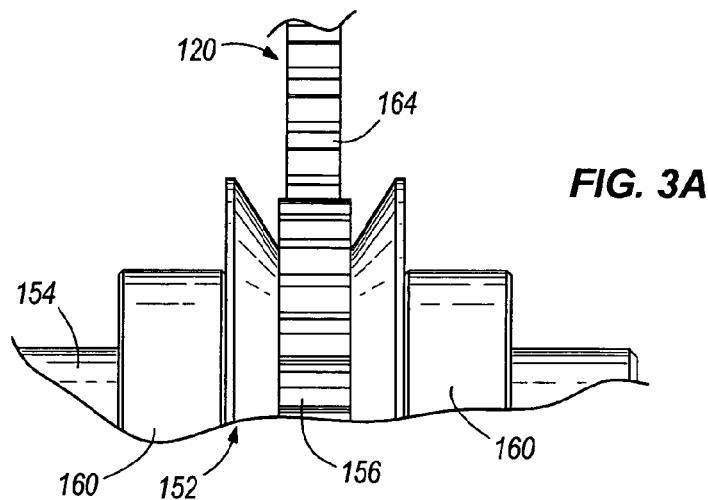

The screen 24 is supported by the support shaft 92 of the auger 88 and includes two screen bearings 144 through which the auger shaft 92 passes. The auger shaft 92 also maintains alignment of the screen 24. A screen drive 148 (FIGS. 1 and 3), including a brake motor, is drivingly connected to the screen 24 by a screen sprocket 152. As shown in FIG. 3A, the screen sprocket 152 is mounted to a shaft 154 extending from the screen drive 148 and includes a gear plate 156 sandwiched between two plates 160. An outer circumference of the inlet end wall 124 of the screen 24 includes gear teeth 164 that matingly engage the gear plate 156 of the screen sprocket 152. It should be noted that the screen sprocket 152 also prevents lateral movement of the screen 24 within the tank 44.

Figure 4:
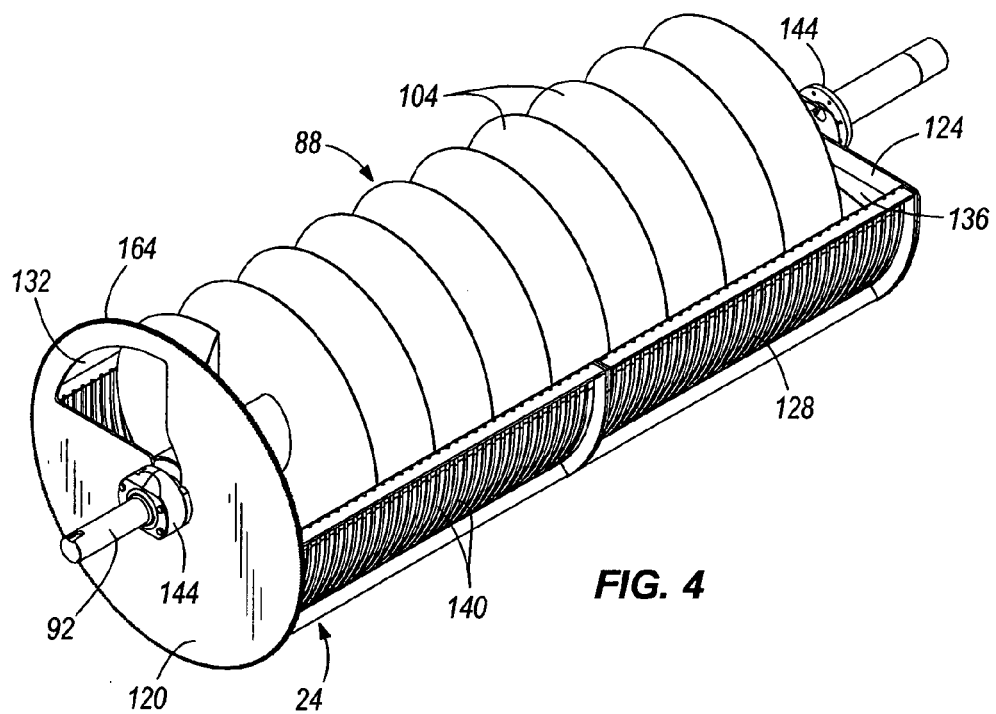
FIG. 4 is a perspective view of one embodiment of a screen of the rotary screw blancher shown in a first, processing position.
Figure 5:
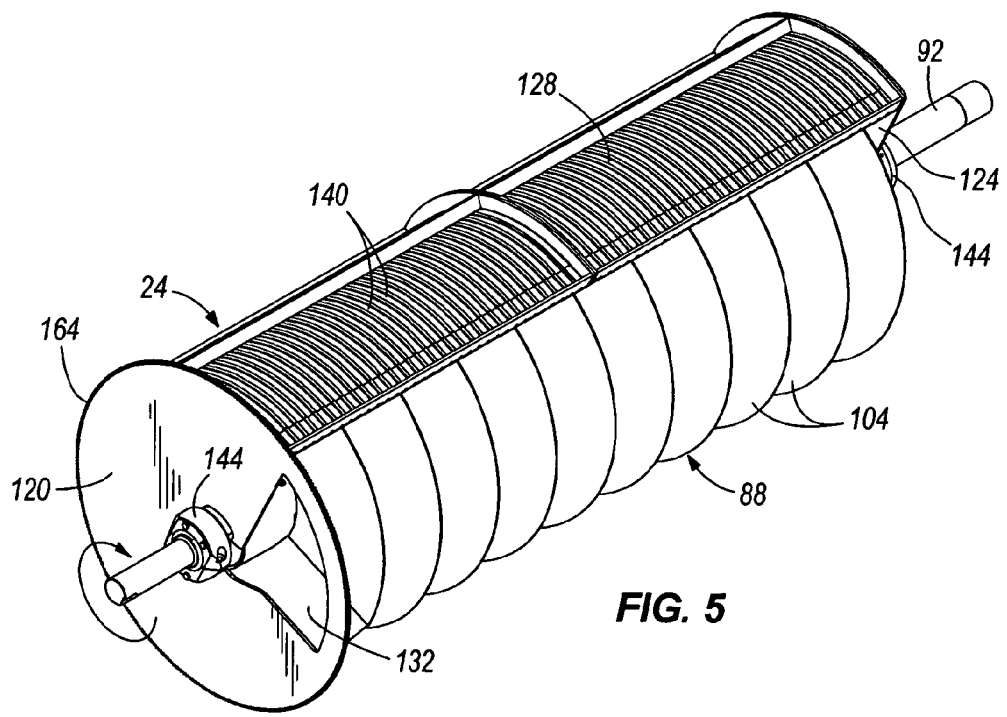
FIG. 5 is a perspective view of the screen of FIG. 4 in a second, cleaning position.

In use, the screen 24 is fixed relative to the tank 44 and the auger 88 rotates within the screen 24 to advance food product from the inlet end 32 of the tank 44 to the outlet end 40. The brake motor 148 holds the screen 24 in place and prevents rotation of the screen 24 with the auger 88. FIG. 4 illustrates the screen 24 and auger 88 when the screen 24 is fixed in an initial, food processing position to advance food product. To clean the screen 24 and portions of the tank 44 located below or behind the screen 24, the brake motor 148 is released and the screen drive 148 rotates the shaft 154 and screen sprocket 152, which thereby rotates the screen 24. The screen 24 is then rotated from its food processing position about the bearings 144 (i.e., a longitudinal axis defined by the auger support shaft 92) to a second, cleaning position shown in FIG. 5. The auger 88 may or may not continue rotating during rotation of the screen 24.

Rotation of the screen 24 deposits food product remnants to a bottom of the tank 44 and provides access to a bottom of the screen 24 and the bottom of the tank 44 to clean contaminant accumulation. In the illustrated embodiment, the screen 24 is configured to rotate 360° about the bearings 144 (although in FIG. 5 the screen 24 is shown rotated approximately 120°). In a further embodiment the screen 24 may rotate at most 180°. To facilitate cleaning, the screen 24 is held in the second, cleaning position by the brake motor 148. Once cleaning is complete, the screen 24 is rotated back to the food processing position by the screen drive 148 and held in place relative to the tank 44 by the brake motor 148. In a further embodiment, the screen 24 includes removable panels or portions to facilitate cleaning of the screen 24 and other components within the inner compartment 56 of the tank 44.

In the illustrated embodiment, the screen 24 and the auger 88 are configured and adapted to maintain a tight tolerance between the two, which will not decrease a clearance between the screen 24 and the auger 88 as the screen bearings 144 wear. A clearance gap between the sidewall 128 and the auger flights 104 is preferably between about 0.01 inches and about 0.5 inches, more preferably between about 0.02 inches and 0.1 inches, and most preferably about 0.06 inches. The tight tolerance between the screen 24 and the auger 88 reduces damage to food product passing through the screen, because the small clearance gap prevents even small size food product, such as rice, beans, and noodles, from becoming stuck between the screen 24 and the auger 88. Further, the clearance gap is sufficient to prevent metal-to-metal contact between the screen 24 and the auger 88, as the auger 88 rotates, which introduces contaminant metal particles into the food product.

Heat transfer medium is supplied to the inner compartment 56 of the tank 44 from a supply source (not shown) by an inlet (not shown) disposed in the inner compartment 56 and is drained from the inner compartment 56 through an outlet (not shown). In one embodiment, there is a constant flow of heat transfer medium into and out of the blancher 20 through the inlet and the outlet, which in one embodiment may also assist in cleaning of the blancher 20. The screen 24 is constructed and arranged to receive heat transfer medium such that the heat transfer medium can surround and contact the food product within the screen 24. In the screen 24, the heat transfer medium blanches or cooks the food product as the food product is advanced through the screen 24 by the auger 88. The heat transfer medium comprises any number of liquids, non-liquids or a combination liquid/non-liquid medium, including, but not limited to water, steam, heated gas or vapor, water and steam, water and water vapor, or the like. In another embodiment, the heat transfer medium is supplied to the inner compartment 56 by a manifold disposed in the inner compartment 56 and positioned in the bottom of the tank 44, which directly injects steam into the inner compartment 56.

The rotary blancher 20 includes two manifolds 168 positioned within the bottom portion of the tank 44, each manifold 168 including a plurality of injectors 172, or agitators, directed towards the screen 24. Directed flows, jets or streams of fluid are discharged from the injectors 172 into the inner compartment 56 to displace food product in the screen 24 and to help increase heat transfer. In the illustrated embodiment there are two sets of injectors 172, one on each side of the screen 24. Fluid is supplied to each manifold 168 from a header 176, which receives fluid from a supply source (not shown). In one embodiment, the fluid source comprises a source of liquid, such as water, and in another embodiment, the fluid source comprises a source of gas, such as air. Fluid is discharged from the injectors 172 with sufficient force to pass through the screen sidewall 128 and displace the food product. The discharged fluid keeps the food product off the screen sidewall 128, breaks up clumps of food product, protects the food product from damage, and reduces temperature variation in the food product. In one embodiment, the injectors 172 are positioned to discharge fluid toward the screen interior and generally toward the center of the screen 24. In another embodiment, at least some of the injectors 172 are aimed at a target point where food product is known to congregate while the auger 88 is rotating. In still another embodiment, the heat transfer medium is distributed through the two manifolds 168 and injectors 172 also. One example of the injectors 172 is further described in U.S. Pat. Nos. 6,214,400 and 6,234,066, which are assigned to Lyco Manufacturing Inc. (Columbus, Wis.), the assignee of the application herein, and which are hereby incorporated by reference.

To clean the tank 44, cleaning fluid is supplied to the inner compartment 56 of the tank 44 from a supply source (not shown) by manifolds 180 (FIG. 3) disposed in the inner compartment 56 and positioned adjacent the tank cover 72. Although only one manifold 180 is shown in FIG. 3, it is apparent from FIG. 1 that clean-in-place headers 184 supply cleaning fluid to two manifolds 180 in the inner compartment 56, and in a further embodiment fewer or more manifolds 180 may be used. Once the screen 24 is rotated to the second, cleaning position, cleaning fluid is discharged into the inner compartment 56 to clean the tank 44, the auger 88, and the screen 24 of contaminants and the fluid and contaminants are drained from the inner compartment 56 through the outlet. The cleaning fluid any number of liquids or a combination liquid/non-liquid medium, including, but not limited to water, water and steam, water and water vapor, or the like. Further, the cleaning manifolds 180 may be supplied with the same fluid as the manifolds 168.

Figure 6:
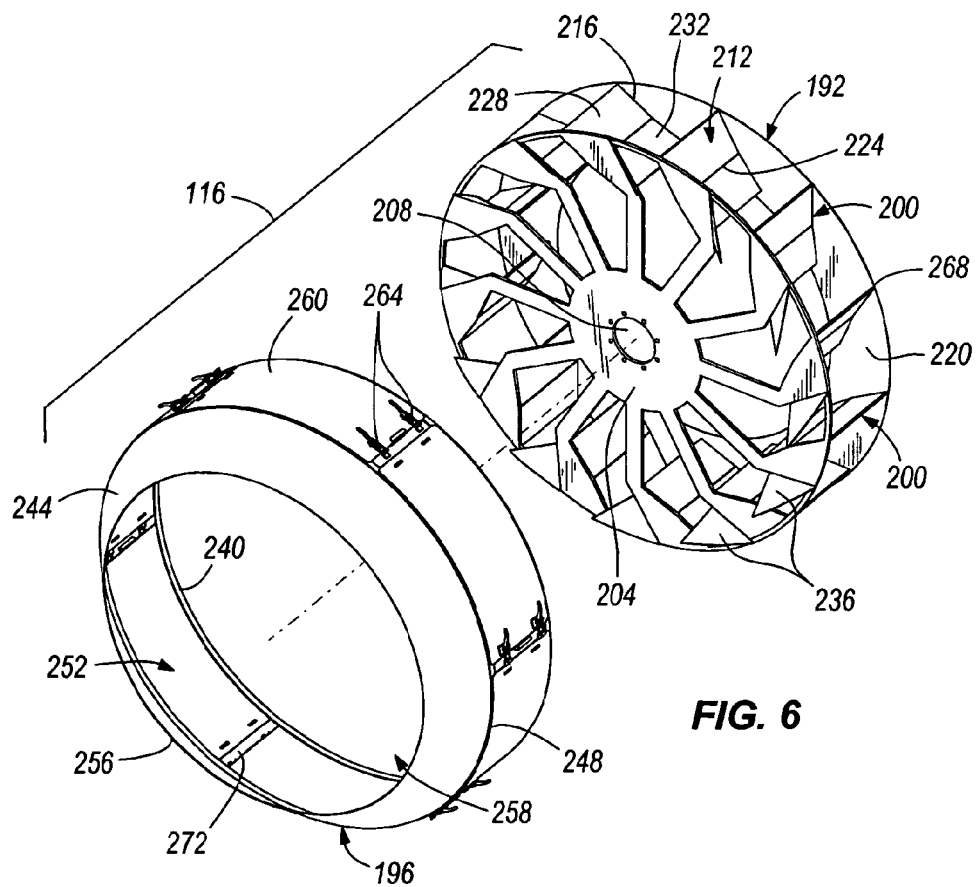
FIG. 6 is an exploded view of a lift assembly of the rotary screw blancher.

The rotary blancher 20 includes the lift assembly 116 (FIGS. 2 and 3) for transferring food product from an outlet end 188 of the screen 24 to the discharge chute 36 of the blancher 20. An exploded view of the lift assembly 116 is shown in FIG. 6. The lift assembly 116 is positioned between the outlet end wall 124 of the screen 24 and the outlet end wall 64 of the tank 44. The lift assembly 116 includes a lift portion 192 and a housing portion 196. The lift portion 192 includes a plurality of circumferentially spaced apart radial lifting buckets 200 used for transferring food product. The lifting buckets 200 extend radially outward from a central portion 204 and the central portion 204 includes an opening 208 for mounting the lift assembly 116 to the auger shaft 92, such that the lifting buckets 200 rotate with the auger 88. Each lifting bucket 200 is formed from a sheet 212 partially cut from the lift portion 192 and folded perpendicular to the lift portion 192 to axially extend from the lift portion 192. A free edge 216 of each sheet 212 is attached to a ring portion 220 axially spaced from the central portion 204.

Each lifting bucket 200 includes a bend 224 that divides the sheet 212 into a first segment 228 and a second segment 232, whereby the second segment 232 provides a ramp to help guide food product toward the discharge chute 36. The lift portion 192 also includes a plurality of flanges 236 cut from the lift portion 192 and folded away from the lifting buckets 200. Each flange 236 is positioned opposite a lifting bucket 200 and helps to guide food product into the respective lifting bucket 200.

The housing portion 196 includes an outer wall 240 and a flange portion 244 extending radially inward from a first edge 248 of the outer wall 240 toward the auger 88. The outer wall 240 and the flange portion 244 define an interior area 252 of the housing portion 196. A free edge 256 of the flange portion 244 defines an opening 258 for food product to enter the lift assembly 116. Access doors 260, shown in a closed position, are formed in the outer wall 240 of the housing portion 196, which may be opened to facilitate cleaning of the lift assembly 116 between product runs. Although latches 264 are shown in FIG. 6 to secure the access doors 260 closed, it should be readily apparent to those of skill in the art that in further embodiments other fastening means may be used to secure the access doors 260. As shown in FIGS. 2 and 3, when assembled, the lift portion 192 of the lift assembly 116 is pressure fit within the interior area 252 of the housing portion 196. An outer circumference 268 of the lift portion 192 contacts an inner surface 272 of the outer wall 240 to hold the housing portion 196 relative to the lift portion 192.

In operation, the lift assembly 116 rotates with the auger 88 and is positioned adjacent the outlet end wall 124 of the screen 24. The auger 88 advances food product through the screen 24 and once the food product reaches the outlet end wall 124 of the screen 24, the food product passes through the openings 136, 258 in the outlet end wall 124 and the housing portion 196 into the lift assembly 116. As the lifting bucket 200 rotates towards the bottom of the tank 44, the respective flange 236 engages a discrete amount of food product and guides food product into the lifting bucket 200, i.e., onto the sheet 212, and lifts the food product as the lift assembly 116 continues to rotate. As the lifting bucket 200 rotates toward a top of the tank 44, the food product slides off the sheet 212 and is deposited in the discharge chute 36. In a further embodiment, a single radial lifting bucket is used to transfer food product to the discharge chute 36, the lift assembly 116 rotates independently of the auger 88, or the sheet 212 of the lifting bucket 200 is perforate to de-water the food product.

Figure 7:
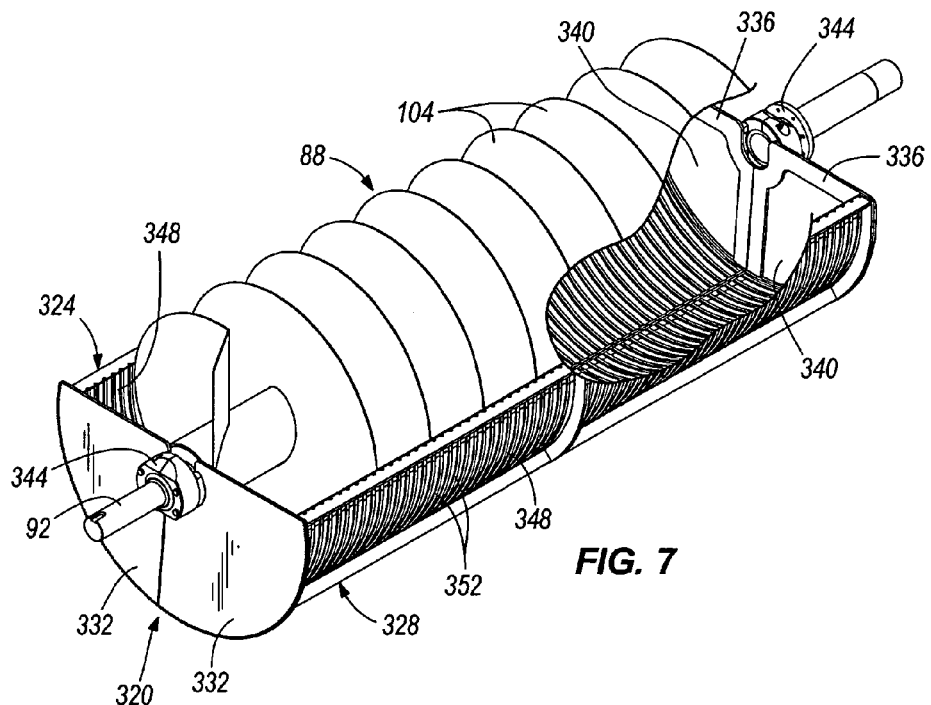
FIG. 7 is a perspective view of another embodiment of a screen of the rotary screw blancher shown in a first, processing position.
Figure 8:
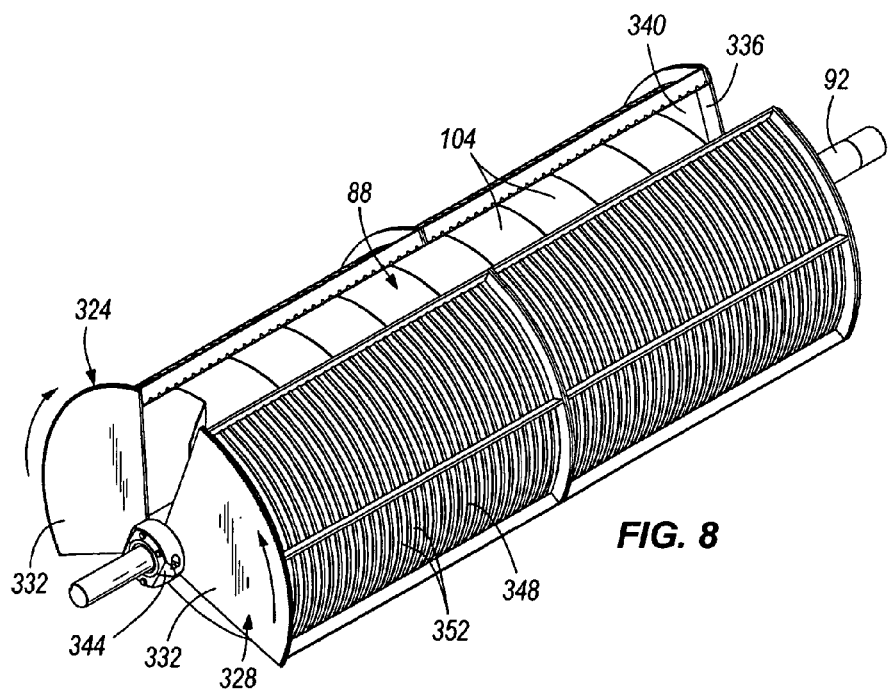
FIG. 8 is a perspective view of the screen of FIG. 7 in a second, cleaning position.

FIGS. 7 and 8 illustrate a second embodiment of an open-top screen 320 for use with the rotary blancher 20 and the auger 88. The screen 320 is mounted in the inner compartment 56 of the tank 44 and is configured to transport food product received in the blancher 20 from the inlet end 32 to the outlet end 40 of the tank 44. The screen 320 includes a generally quadrant shaped first portion 324 and a generally quadrant shaped second portion 328 that are attached together to form the generally semi-cylindrical screen 320. Each screen portion 324, 328 includes an inlet end wall 332 positioned proximate the inlet end 32 of the tank 44 and an outlet end wall 336 positioned proximate the outlet end 40 of the tank 44. The inlet end walls 332 are solid to keep food product within the screen 320 and the outlet end walls 336 each define an opening 340 to facilitate transfer of food product from the screen 320 to the lift assembly 116. The screen 320 is supported by the support shaft 92 of the auger 88 and includes two screen bearings 344 through which the auger shaft 92 passes. As shown in FIG. 7, the inlet end walls 332 and the outlet end walls 336 of the screen portions 324, 328 each jointly define an opening for the shaft 92 of the auger 88. In one embodiment, a screen drive (not shown), including a brake motor, is drivingly connected to each screen portion 324, 328 by a screen sprocket (not shown) to alternatively hold the screen 320 in the first, food processing position and rotate the screen portions 324, 328 to the second, cleaning position.

Each screen portion 324, 328 includes a perforate sidewall 348 that substantially extends between the screen end walls 332, 336. The sidewall 348 is a wire screen that defines a plurality of small slots 352 that extend completely through the sidewall 348 to allow heat transfer medium to pass to the inner compartment 56, through the sidewall 348 and into the screen 24. In another embodiment, perforations in the sidewall 348 of the screen portions 324, 328 consist of a plurality of small diameter bores or laser cut holes. It should be readily apparent to those of skill in the art, that the screen 320 may include more than two portions and may have a shape other than semi-cylindrical.

In use, the screen portions 324, 328 are secured together and fixed relative to the tank 44 such that the auger 92 rotates within the screen 320 to advance food product from the inlet end 32 of the tank 44 to the outlet end 40. A brake motor (not shown) holds the screen 320 in place and prevents rotation of the screen 320 with the auger 88. FIG. 7 illustrates the screen portions 324, 328 and the auger 88 when the screen 320 is fixed in an initial, food processing position to advance food product. To clean the screen portions 324, 328 and portions of the tank 44 located below or behind the screen 320, the brake motor is released and the screen drive rotates the shaft 92 and the screen sprockets, which thereby rotates the screen portions 324, 328. The screen portions 324, 328 are then rotated from the food processing position about the bearings 344, or a longitudinal axis defined by the auger support shaft 92, to a second, cleaning position shown in FIG. 8. Rotation of the screen portions 324, 328 deposits food product remnants to the bottom of the tank 44 and provides access to the bottom of the screen portions 324, 328 and the bottom of the tank 44 to clean contaminant accumulation. In the illustrated embodiment, the screen portions 324, 328 are configured to rotate about 180° in opposite directions about the bearings 344 (although in FIG. 8 the screen portions 324, 328 are shown rotated about 45° each). In a further embodiment, the screen portions 324, 328 may rotate in the same direction or may rotate more than 180°. To facilitate cleaning, the screen portions 324, 328 are held in the second, cleaning position by the brake motor. Once cleaning is complete, the screen portions 324, 328 are rotated back to the food processing position and secured relative to the tank 44. In another embodiment, the screen portions 324, 328 are fixed relative to the tank 44 by mechanical means and are manually rotated to facilitate cleaning of the blancher 20.

Figure 9:
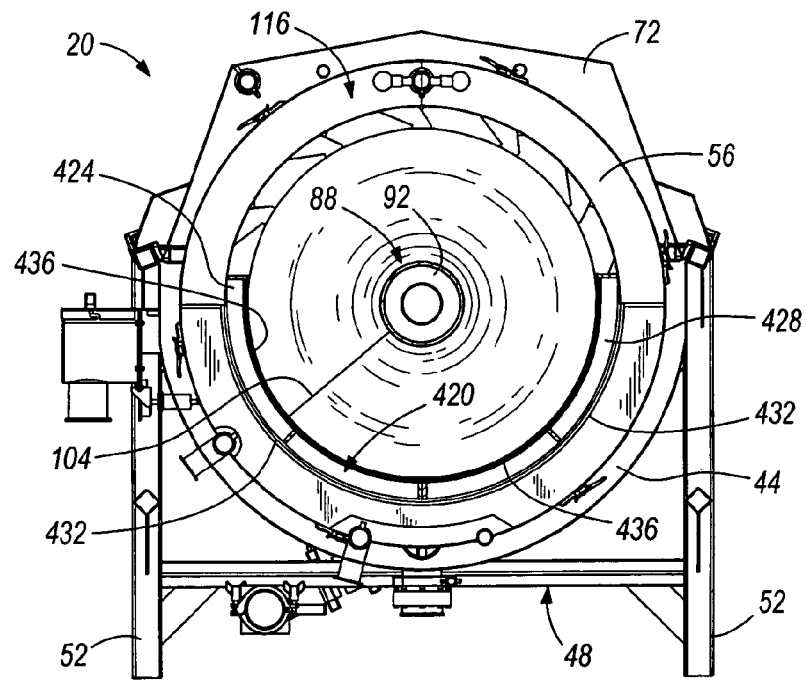
FIG. 9 is a sectional view of a rotary screw blancher illustrating another embodiment of a screen shown in a first, processing position.
Figure 10:
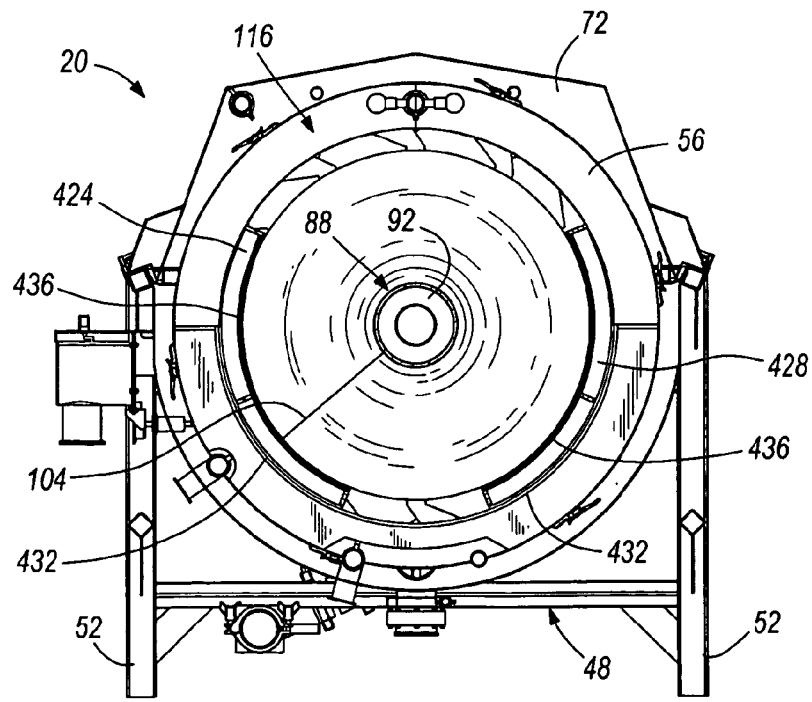
FIG. 10 is a sectional view of the rotary screw blancher of FIG. 9 showing the screen in a second, cleaning position.

FIGS. 9 and 10 are sectional views of the blancher 20 that illustrate a third embodiment of an open-top screen 420 for use with the rotary blancher 20 and the auger 88. The screen 420 is mounted in the inner compartment 56 of the tank 44 and is configured to transport food product received in the blancher 20 from the inlet end 32 to the outlet end 40 of the tank 44. Similar to the screen 320 shown in FIGS. 7 and 8, the screen 420 includes a generally quadrant shaped first portion 424 and a generally quadrant shaped second portion 428 that are attached together to form the generally semi-cylindrical screen 420. The screen portions 424, 428 fit around the support shaft 92 of the auger 88, but are not supported by the shaft 92. Multiple pairs of tracks 432 (only one pair is shown in FIGS. 9 and 10) are mounted to the bottom portion of the tank 44 and the tracks support the screen 420 within the tank 44.

Although not shown in FIGS. 9 and 10, each screen portion 424, 428 includes an inlet end wall positioned proximate the inlet end 32 of the tank 44 and an outlet end wall positioned proximate the outlet end 40 of the tank 44, which are similar to the end walls 332, 336 shown and described with respect to FIGS. 7 and 8. Each screen portion 424, 428 includes a perforate sidewall 436 that substantially extends between the screen end walls. The sidewall 436 is a wire screen that defines a plurality of small slots that extend completely through the sidewall 436 to allow heat transfer medium to pass to the inner compartment 56, through the sidewall 436 and into the screen 420. In another embodiment, perforations in the sidewall 436 of the screen portions 424, 428 consist of a plurality of small diameter bores or slots, or laser cut holes or slots.

FIG. 9 illustrates the screen portions 424, 428 and the auger 88 when the screen 420 is fixed in an initial, food processing position to advance food product. In use, the screen portions 424, 428 are secured together (e.g., a clamp or latch) and mechanically fixed relative to the tank 44 such that the auger 88 rotates within the screen 420 to advance food product from the inlet end 32 of the tank 44 to the outlet end 40. The screen 420 is held in place and does not rotate with the auger 88. To clean the screen portions 424, 428 and portions of the tank 44 located below or behind the screen 420, the screen portions 424, 428 are unsecured from each other and the tank 44 to allow the screen portions 424, 428 to rotate. The screen portions 424, 428 are then rotated from the food processing position along the tracks 432 to a second, cleaning position shown in FIG. 10. The screen portions 424, 428 ride along the tracks 432 to rotate within the tank 44. Rotation of the screen portions 424, 428 deposits food product remnants to the bottom of the tank 44 and provides access to the bottom of the screen portions 424, 428 and the bottom of the tank 44 to clean contaminant accumulation. In the illustrated embodiment, the screen portions 424, 428 are configured to rotate between about 5° to about 45° in opposite directions (although in FIG. 10 the screen portions 424, 428 are shown rotated about 10° each). In a further embodiment, the screen portions 424, 428 may rotate in the same direction or may rotate more than 90°. Once cleaning is complete, the screen portions 424, 428 are rotated back to the food processing position and secured relative to each other and the tank 44. In another embodiment, the screen portions 424, 428 are fixed relative to the tank 44 by a brake motor and are rotated by a drive mechanism to facilitate cleaning of the blancher 28.

Figure 11:
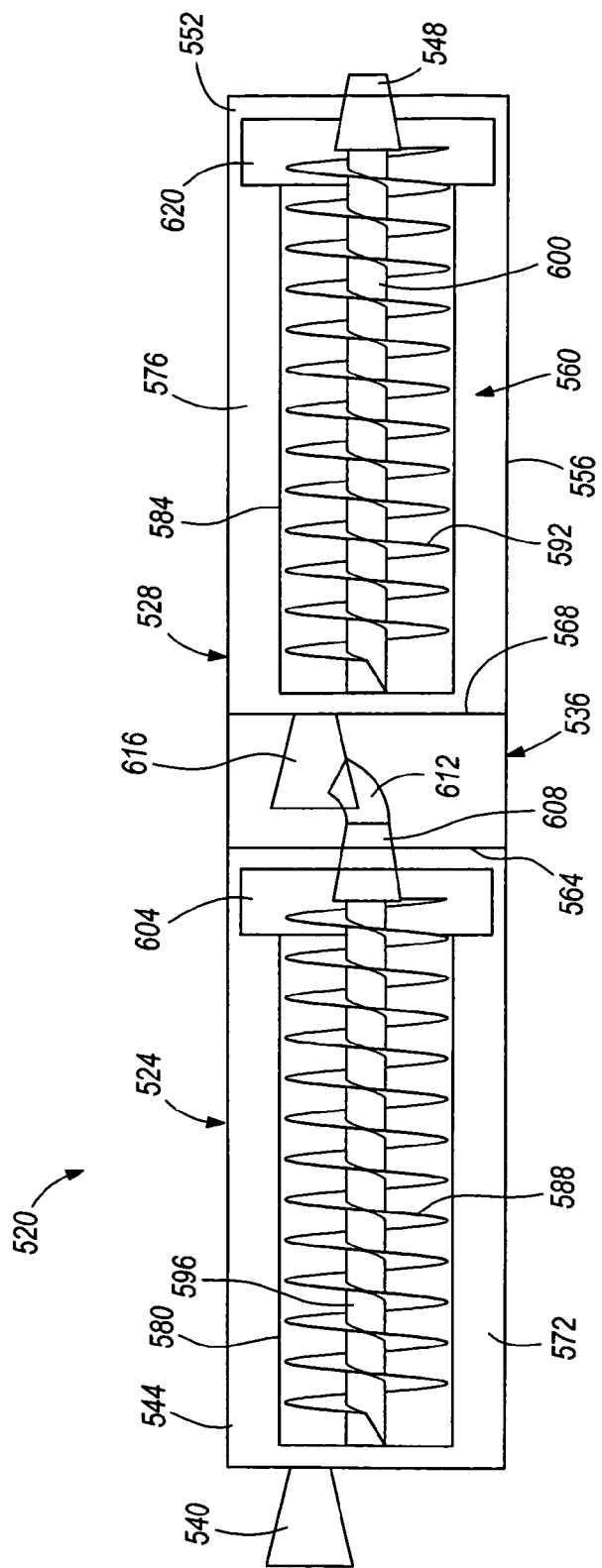
FIG. 11 is a schematic diagram of a rotary cooker-cooler embodying the invention.

FIG. 11 is a schematic diagram of a rotary screw cooker-cooler 520 embodying the invention. The cooker-cooler 520 includes a cooker 524 and a cooler 528 housed within one frame having a transfer section 536 between the cooker portion 524 and the cooler portion 528. Food product is deposited into the cooker-cooler 520 at an infeed flume 540 at an inlet end 544 and discharged from the cooker-cooler 520 at a discharge chute 548 at an outlet end 552. The cooker-cooler 520 includes an open-top tank 556 that is supported by a frame (not shown). The tank 556 defines, in part, an inner compartment 560 of the cooker-cooler 520. First and second baffles 564, 568 are positioned between the cooker portion 524 and the cooler portion 528 such that a heat compartment 572 is defined between the inlet end 544 and the first baffle 564, a cool compartment 576 is defined between the second baffle 568 and the outlet end 552, and the transfer section 536 is defined between the first and second baffles 564, 568. Heat transfer medium is supplied to the heat compartment 572 to cook food product that advances through an open-top screen 580 in the cooker portion 524 and cool transfer medium is supplied to the cool compartment 576 to cool food product that advances through an open-top screen 584 in the cooler portion 528. The open-top screens 580, 584 are preferably one of the embodiments discussed above.

An auger 588, or helical screw, is disposed within the heat compartment 572 and another auger 592 is disposed within the cool compartment 576. Each auger 588, 592 includes a support shaft 596, 600 that extends between end walls of the respective screens 580, 584 and each auger 588, 592 and auger shaft 596, 600 rotates within the respective compartment 572, 576 and screen 580, 584 to advance food product through the screen 580, 584. Food product is supplied into the infeed flume 540, which deposits the food product into the heat compartment 572 and the first screen 580. The first auger 588 rotates to advance food product from the inlet end 544 of the tank 556 toward the first baffle 564. A lift assembly 604, similar to the lift assembly 116 described above with respect to the rotary screw blancher 20, transfers food product from the first screen 580 to a discharge chute 608 of the cooker portion 524. The discharge chute 608 extends from the heat compartment 572 to the transfer section 536 and communicates with a slide 612, which communicates with an infeed flume 616 of the cooler portion 528. Food product in the discharge chute 608 of the cooker portion 524 travels through the slide 612 to the infeed flume 616, which deposits food product into the cool compartment 576 and the second screen 584. The second auger 592 rotates to advance food product toward the outlet end 552 of the tank 556. A lift assembly 620, similar to the lift assembly 116 described above with respect to the rotary screw blancher 20, transfers food product from the second screen 584 to the discharge chute 548 of the cooler portion 528.

In use, the open-top screens 580, 584 are fixed relative to the tank 556 in an initial, food processing position and the augers 588, 592 rotates within the respective screen 580, 584 to advance food product through the screen 580, 584. To clean the screens 580, 584 and portions of the tank 556 located below or behind the screens 580, 584, the screens 580, 584 are rotated about the respective auger shaft 596, 600 to a second, cleaning position. Rotation of the screens 580, 584 deposits food product remnants to the bottom of the tank 556 and provides access the bottom of the screens 580, 584 and the bottom of the tank 556 to clean contaminant accumulation. Cleaning fluid is supplied to the inner compartment 560 of the tank 556 by manifolds (not shown) to clean the tank 556, the screens 580, 584, and the augers 588, 592, similar to the description described above with respect to the rotary blancher 20.

In one embodiment, the heat and cool compartments 572, 576 of the rotary cooker-cooler 592 includes injector manifolds, as described above with respect to the rotary blancher 20, that direct flow, jets or streams of fluid into the compartments 572, 576 to displace food product in the screens 580, 584 and to help increase heat or cool transfer. In another embodiment, the screens 580, 584 and the augers 588, 592 are configured and adapted to maintain a tight tolerance between the two, similar to the rotary blancher 20 described above. A clearance gap between a sidewall of each screen and auger flights of the respective auger is preferably between about 0.01 inches and about 0.5 inches, more preferably between about 0.02 inches and 0.1 inches, and most preferably about 0.06 inches.

It should be readily apparent to those of skill in the art that the present invention rotary cooker-cooler 520 may be adapted for use in a blancher having multiple heat compartments or cooling compartments, or a cooler having multiple cooling compartments.

The rotary blancher 20 and the rotary cooker-cooler 520 described above, and in particular the open-top screen, improves the efficiency of food processing within a facility. Due to the ease of accessing, moving and cleaning the screen, machine down time between product runs and the amount of labor required to facilitate cleaning is reduced. Further, the open-top screen design and rotation of the screen for cleaning allows greater access to the screen and tank bottom for cleaning contaminant accumulation, and facilitates use of an automated cleaning system. As a result, more batches of food product may be processed during a single day or shift.

Further the rotary blancher 20 and the rotary cooker-cooler 520 described above includes an increased capacity for processing foods, but also gently handles the food product advanced through the tank. Directed flow of water through the screen reduces temperature variation in the food product, helps fluidize food product within the screen, and allows additional food product to be deposited in the screen because the food product does not rest on the sidewall of the screen. Thus, the food processing apparatus described above process a volume of food product typically processed in a larger machine, while occupying less floor space.

In the embodiments where the screen is supported on the support shaft of the auger, such a configuration allows for very tight tolerances between the screen and the auger flights, which prevents damage to food product because there is not sufficient room for food product to become stuck between the screen 24 and the auger flights. Further, the tight tolerance will not decrease a clearance between the two as the screen bearings wear and prevents metal-to-metal contact between the screen 24 and the auger 88.

Various features and advantages of the invention are set forth in the following claims.

What is claimed is:

1. A food processing apparatus comprising:
a compartment having an inlet end for receiving food product and an outlet end for discharging food product;
a screen mounted within the compartment, the screen including a screen wall having a length, a circumferential first end and an opposite, circumferential second end, the first end and the second end defining therebetween a circumferentially-extending open portion of the screen, the open portion extending along at least a portion of the length of the screen wall, the screen being oriented relative to the compartment, during a food processing operation, in a first orientation, in which the screen supports the food product and the open portion opens at least partially upwardly in a first direction, the screen being adjustable to a second orientation, in which the screen is oriented with an open portion opening in second direction different than the first direction, wherein the screen is formed of a first screen portion and a separate, second screen portion, the first screen portion and the second screen portion being relatively movable; and
an auger mounted such that at least a portion of the auger is within the screen, a portion of the auger being accessible through the open portion of the screen, the auger being rotatable about an axis and for advancing food product within the compartment from the inlet end toward the outlet end.

2. The food processing apparatus of claim 1, wherein the screen is pivotable about the axis defined by the auger.

3. The food processing apparatus of claim 2, wherein the screen is rotatable about the axis defined by the auger.

4. The food processing apparatus of claim 1, and further comprising a screen drive interconnected with the screen, the screen drive including a brake motor operable to hold the screen in the first position, the brake motor, when released, allowing the screen to move toward the second orientation.

5. The food processing apparatus of claim 1, wherein the first screen portion provides the circumferential first end and has an opposite, circumferential third end, wherein the second screen portion provides the circumferential second end and has an opposite, circumferential fourth end, wherein, in the first orientation of the screen, the third end is positioned adjacent to the fourth end such that food product is supported in the screen.

6. The food processing apparatus of claim 1, and further comprising a support shaft supporting the auger for rotation, wherein the first screen portion and the second screen portion are supported on and rotatable about the support shaft to move toward the second orientation.

7. The food processing apparatus of claim 1, and further comprising a support shaft supporting the auger for rotation, wherein the screen is supported on and rotatable about the support shaft to move toward the second orientation.

8. The food processing apparatus of claim 1, and further comprising a pair of tracks located on a bottom portion of the compartment, the screen being supported by and riding along the tracks as the screen moves toward the second orientation.

9. The food processing apparatus of claim 1, wherein the compartment has a compartment wall, and wherein the food processing apparatus further comprises a plurality of injectors disposed in the compartment between the compartment wall and the screen, the injectors being operable to discharge a fluid under pressure toward the screen.

10. The food processing apparatus of claim 1, wherein the auger includes auger flights having a radial edge, a clearance gap being defined between the screen and the radial edge of the auger, the clearance gap being less than about 0.5 inches.

11. The food processing apparatus of claim 10, wherein the clearance gap is less than about 0.1 inches.

12. The food processing apparatus of claim 11, wherein the clearance gap is about 0.06 inches.

13. The food processing apparatus of claim 1, wherein the screen includes a wedge wire screen.

14. The food processing apparatus of claim 1, and further comprising a tank at least partially defining the compartment.

15. The food processing apparatus of claim 1, and further comprising a lift assembly at least partially positioned within the compartment at the outlet end, the lift assembly being operable to lift food product from the screen and to deposit food product in a discharge chute.

16. The food processing apparatus of claim 15, wherein the lift assembly includes at least one lifting bucket rotatable with the auger, the lifting bucket being operable to lift food product from the screen and to deposit food product into a discharge chute.

17. The food processing apparatus of claim 1, wherein the food processing apparatus includes a rotary blancher apparatus.

18. A food processing apparatus comprising:
a compartment having an inlet end for receiving food product and an outlet end for discharging food product;
a screen mounted within the compartment, the screen including a screen wall having a length, a circumferential first end and an opposite, circumferential second end, the first end and the second end defining therebetween a circumferentially-extending open portion of the screen, the open portion extending along at least a portion of the length of the screen wall, the screen being oriented relative to the compartment, during a food processing operation, in a first orientation, in which the screen supports the food product and the open portion opens at least partially upwardly in a first direction, the screen being adjustable to a second orientation, in which the screen is oriented with an open portion opening in second direction different than the first direction;
an auger mounted such that at least a portion of the auger is within the screen, a portion of the auger being accessible through the open portion of the screen, the auger being rotatable about an axis and for advancing food product within the compartment from the inlet end toward the outlet end; and
a lift assembly at least partially positioned within the compartment at the outlet end, the lift assembly being operable to lift food product from the screen and to deposit food product in a discharge chute, wherein the lift assembly includes an outer wall and a door in the outer wall for accessing the at least one lifting bucket.

19. A food processing apparatus comprising:
a compartment having an inlet end for receiving food product and an outlet end for discharging food product;
a baffle dividing the compartment into a first compartment portion and a second compartment portion;
a first screen mounted within the first compartment portion, the first screen being oriented relative to the compartment in a first orientation, at least during a food processing operation, in which the first screen supports food product;
a first auger mounted such that at least a portion of the auger is within the first screen, the first auger being rotatable for advancing food product within the compartment from the inlet end toward the baffle;
a second screen mounted within the second compartment portion, the second screen being oriented relative to the compartment in a first orientation, at least during a food processing operation, in which the second screen supports food product;
a second auger mounted such that at least a portion of the auger is within the second screen, the second auger being rotatable for advancing food product within the compartment toward the outlet end; and
a product transfer mechanism for transferring food product from the first compartment portion to the second compartment portion;
wherein one of the first screen and the second screen includes a screen wall having a length, a circumferential first end and an opposite, circumferential second end, the first end and the second end defining therebetween a circumferentially-extending open portion of the one of the first screen and the second screen, the open portion extending along at least a portion of the length of the screen wall, the one of the first screen and the second screen being oriented relative to the compartment, during a food processing operation, in the first orientation, in which the one of the first screen and the second screen supports the food product and the open portion opens at least partially upwardly in a first direction, the one of the first screen and the second screen being adjustable to a second orientation, in which the one of the first screen and the second screen is oriented with an open portion opening in second direction different than the first direction.

20. The food processing apparatus of claim 19, wherein the first screen and the second screen each include a screen wall having a length, a circumferential first end and an opposite, circumferential second end, the first end and the second end defining therebetween a circumferentially-extending open portion of each of the first screen and the second screen, the open portion extending along at least a portion of the length of the screen wall, each of the first screen and the second screen being oriented relative to the compartment, during a food processing operation, in the first orientation, in which each of the first screen and the second screen supports the food product and the open portion opens at least partially upwardly in a first direction, each of the first screen and the second screen being adjustable to a second orientation, in which each of the first screen and the second screen is oriented with an open portion opening in second direction different than the first direction.

21. The food processing apparatus of claim 19, wherein the food processing apparatus includes a rotary cooker-cooler.

22. The food processing apparatus of claim 19, wherein the first compartment portion has an outlet end proximate the baffle, and wherein the product transfer mechanism includes
a lift assembly positioned within the compartment proximate the outlet end of the first compartment portion, the lift assembly including at least one lifting bucket rotatable with the first auger for lifting food product from the first screen, and
a slide having a first end and a second end and extending between the first compartment portion and the second compartment portion, the at least one lifting bucket depositing food product in the first end of the slide, the second end of the slide being in communication with the second compartment portion such that food product deposited in the slide is transferred to the second compartment portion.

23. The food processing apparatus of claim 19, and further comprising a second product transfer mechanism for transferring food product from the second compartment portion to an exterior of the compartment.

24. The food processing apparatus of claim 23, wherein the second product transfer mechanism includes a lift assembly positioned within the second compartment portion, the lift assembly including at least one lifting bucket rotatable with the second auger for lifting food product from the second screen and depositing food product into a discharge chute.

25. The food processing apparatus of claim 19, wherein the compartment has a compartment wall, and wherein the food processing apparatus further comprises a plurality of injectors disposed between the compartment wall and one of the first screen and the second screen, the injectors being operable to discharge a fluid under pressure toward the one of the first screen and the second screen.

26. The food processing apparatus of claim 25, and further comprising:
- a first plurality of injectors disposed in the first compartment section between the compartment wall and the first screen, the first plurality of injectors being operable to discharge a fluid under pressure toward the first screen; and
- a second plurality of injectors disposed in the second compartment portion between the compartment wall and the second screen, the second plurality of injectors being operable to discharge a fluid under pressure toward the second screen.

27. The food processing apparatus of claim 19, and further comprising a tank at least partially defining the compartment.

28. A rotary blancher comprising:
- a compartment having an inlet end for receiving food product and an outlet end for discharging food product;
- a screen mounted within the compartment, the screen including a screen wall having a length, a circumferential first end and an opposite, circumferential second end, the first end and the second end defining therebetween a circumferentially-extending open portion of the screen, the open portion extending along at least a portion of the length of the screen wall, the screen being positioned relative to the compartment, during a food processing operation, in a first position, in which the screen supports the food product and the open portion opens at least partially upwardly in a first direction, the screen being pivotable to a second position, in which the screen is oriented with an open portion opening in second direction different than the first direction;
- an auger mounted such that at least a portion of the auger is within the screen, a portion of the auger being accessible through the open portion of the screen, the auger being rotatable about an axis and for advancing food product within the compartment from the inlet end toward the outlet end; and
- a pair of tracks located on a bottom portion of the compartment, the screen being supported by and riding along the tracks as the screen moves toward the second position.

* * * * *